(12) United States Patent
Ogilvie et al.

(10) Patent No.: US 7,194,567 B2
(45) Date of Patent: Mar. 20, 2007

(54) METHOD AND SYSTEM FOR ORDERING REQUESTS AT A BUS INTERFACE

(75) Inventors: Clarence R. Ogilvie, Huntington, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 11/064,728

(22) Filed: Feb. 24, 2005

(65) Prior Publication Data

US 2006/0190651 A1 Aug. 24, 2006

(51) Int. Cl.
G06F 13/00 (2006.01)
G06F 13/14 (2006.01)
G06F 13/22 (2006.01)
G06F 13/38 (2006.01)

(52) U.S. Cl. .................. 710/310; 710/52; 710/53; 710/54; 710/220

(58) Field of Classification Search ........... 710/220, 710/52, 53, 310, 54

See application file for complete search history.

(56) References Cited

U.S. PATENT DOCUMENTS

| | | | |
|---|---|---|---|
| 4,281,381 A * | 7/1981 | Ahuja et al. ............. 710/111 |
| 5,038,346 A * | 8/1991 | Courtois ................. 370/440 |
| 5,546,546 A * | 8/1996 | Bell et al. .............. 710/112 |
| 5,581,705 A | 12/1996 | Passint et al. |
| 5,740,409 A | 4/1998 | Deering |
| 5,778,096 A | 7/1998 | Stearns |
| 5,835,739 A * | 11/1998 | Bell et al. .............. 710/309 |
| 5,841,973 A | 11/1998 | Kessler et al. |
| 5,893,151 A | 4/1999 | Merchant |
| 6,021,451 A | 2/2000 | Bell et al. |
| 6,124,868 A * | 9/2000 | Asaro et al. ............ 345/558 |
| 6,247,086 B1 * | 6/2001 | Allingham ............. 710/314 |
| 6,363,438 B1 | 3/2002 | Williams et al. |
| 6,405,276 B1 * | 6/2002 | Chen et al. ............. 710/310 |
| 6,449,699 B2 | 9/2002 | Franke et al. |
| 6,571,308 B1 | 5/2003 | Reiss et al. |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

*Primary Examiner*—Mark H. Rinehart
*Assistant Examiner*—Jeremy S. Cerullo
(74) *Attorney, Agent, or Firm*—Heslin Rothenberg Farley & Mesiti, PC

(57) ABSTRACT

A bus bridge for coupling between a first bus and a second bus includes: multiple ticket registers; a ticket dispenser counter; and a ticket call counter. The ticket dispenser counter dispenses a ticket value to a request received at the bridge from the first bus for access to the second bus. This ticket value is held in one ticket register of the multiple ticket registers. The ticket call counter provides ticket call values, and the request is granted access to the second bus when a current ticket call value equals the ticket value dispensed to the request. While the request waits for access to the second bus, the bus bridge can perform work on the request. When request coherency is maintained employing snooping, ticket values assigned to a plurality of requests maintain a snoop response ordering of the requests for access to the second bus.

25 Claims, 7 Drawing Sheets

U.S. PATENT DOCUMENTS

| | | |
|---|---|---|
| 6,668,309 B2 | 12/2003 | Bachand et al. |
| 6,694,383 B2 | 2/2004 | Nguyen et al. |
| 6,725,296 B2 | 4/2004 | Craddock et al. |
| 6,799,317 B1 | 9/2004 | Heywood et al. |
| 6,801,207 B1 | 10/2004 | Tischler et al. |
| 6,801,208 B2 | 10/2004 | Keshava et al. |
| 6,816,161 B2 | 11/2004 | Lavelle et al. |
| 6,820,143 B2 | 11/2004 | Day et al. |
| 6,820,174 B2 | 11/2004 | Vanderwiel |
| 6,889,284 B1 | 5/2005 | Nizar et al. |
| 6,978,319 B1 | 12/2005 | Rostoker et al. |
| 2004/0117592 A1 | 6/2004 | Day et al. |
| 2004/0156199 A1 | 8/2004 | Rivas et al. |
| 2004/0162946 A1 | 8/2004 | Day et al. |
| 2004/0168011 A1 | 8/2004 | Hemming |
| 2004/0263519 A1 | 12/2004 | Andrews et al. |
| 2006/0069788 A1 | 3/2006 | Blackmore et al. |

\* cited by examiner

METHOD AND SYSTEM FOR ORDERING REQUESTS AT A BUS INTERFACE

CROSS REFERENCE TO RELATED APPLICATIONS

This application contains subject matter which is related to the subject matter of the following applications, each of which is assigned to the same assignee as this application and each of which is hereby incorporated herein by reference in its entirety:

"Data Ordering Translation Between Linear and Interleaved Domains at a Bus Interface", Horton et al., Ser. No. 11/064,569, co-filed herewith;

"Method and System for Controlling Forwarding or Terminating of a Request at a Bus Interface Based on Buffer Availability", Ogilvie et al., Ser. No. 11/064,570, co-filed herewith; "Computer System Bus Bridge", Biran et al., Ser. No. 11/064,568, co-filed herewith;

"Apparatus and Method for Transaction Tag Mapping Between Bus Domains", Kautzman et al., Ser. No. 11/064,567, co-filed herewith;

"Transaction Flow Control Mechanism for a Bus Bridge", Ogilvie et al., Ser. No. 11/064,722, co-filed herewith; "Pipeline Bit Handling Circuit and Method for a Bus Bridge", Drehmel et al., Ser. No. 11/064,744, co-filed herewith; and "Computer System Architecture", Biran et al., Ser. No. 11/064,745, co-filed herewith.

TECHNICAL FIELD

The present invention relates in general to the field of data transfer in a computer system, and more particularly, to methods and systems for maintaining ordering of requests at a bus interface.

BACKGROUND OF THE INVENTION

Computer systems generally include multiple agents, such as microprocessors, storage devices, display devices, etc., which are interconnected via a system bus. The system bus operates to transfer address, data and control signals between these agents. Certain computer systems employ multiple busses, in which various agents are coupled to one or more busses. Typically, each agent is coupled to a single bus.

Bus bridges are often utilized in multiple-bus systems to connect the busses and thereby allow agents coupled to one type of bus to access agents coupled to another type of bus. The function of the bus bridge typically involves transferring commands between two busses. The commands transferred by the bus bridge often have data associated with them (e.g., read or write commands).

One problem which frequently arises in computer systems with multiple agents is a need to preserve transaction ordering. Thus, a bus bridge in a multiple-bus system must address the problem of transaction ordering. Although various bus bridge implementations exist in the art, it is believed advantageous to provide a method and system which resolves the transaction ordering problem in a more effective and efficient manner than previously known. The present invention provides such a solution.

SUMMARY OF THE INVENTION

The shortcomings of the prior art are overcome and additional advantages are provided through a method which includes: receiving at a bus interface a request for access to a resource; employing a first counter to assign a value to the request; and granting the requested access to the resource when a second counter reaches a value equal to the value assigned by the first counter to the request, wherein the bus interface can perform work on the request while the request waits for access to the resource.

In another aspect, a system is provided which includes: means for receiving at a bus interface a request for access to a resource; means for employing a first counter to assign a value to the request; and means for granting the requested access to the resource when a second counter reaches a value equal to the value assigned by the first counter to the request, wherein the bus interface can perform work on the request while the request waits for access to the resource.

In a further aspect, a system is provided which includes a bus bridge for coupling between a first bus and a second bus. The bus bridge includes multiple ticket registers, a ticket dispenser counter, and a ticket call counter. The ticket dispenser counter dispenses a ticket value to a request received at the bus bridge from the first bus for access to the second bus. This ticket value is held in one ticket register of the multiple ticket registers. The ticket call counter provides ticket call values, and the request is granted access to the second bus when a current ticket call value equals the ticket value dispensed to the request by the ticket dispenser counter, and wherein the bus bridge can perform work on the request while the request waits for access to the second bus.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

As used herein, a "request" includes any transaction, reflected transaction, command, reflected command, or other type of request or response, etc., associated with transferring data.

Figure 1:
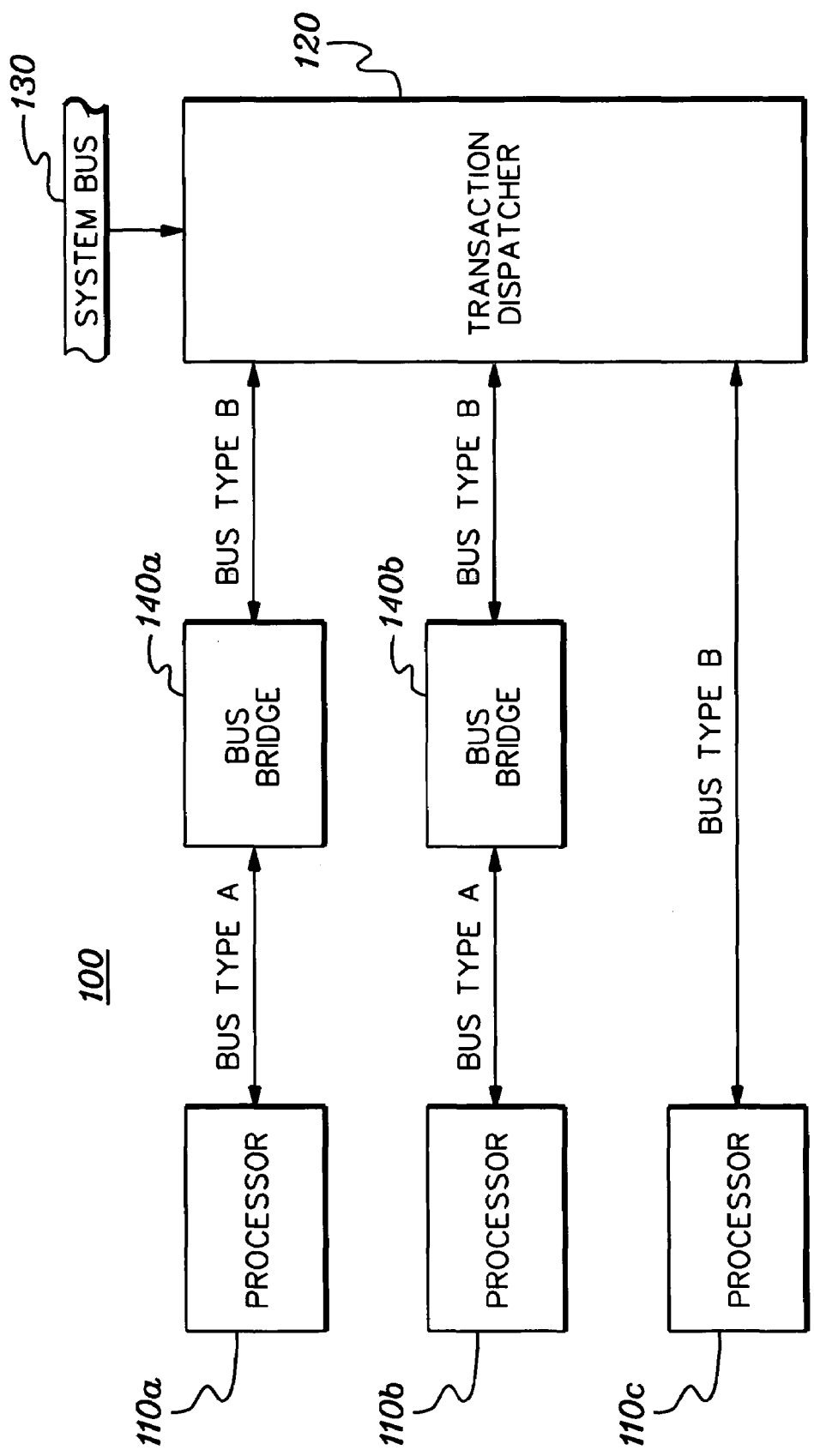
FIG. 1 depicts a partial block diagram representation of a computer system employing bus bridges between different bus types, which may employ one or more aspects of the present invention.

FIG. 1 depicts one embodiment of a computer system, generally denoted 100, to employ one or more aspects of the present invention. In system 100, multiple processors 110a, 110b, 110c are coupled to a system bus 130 via a transaction dispatcher 120. In this example, transaction dispatcher 120 comprises arbitration logic which decides which request to perform next, and may include an address concentrator. Transaction dispatcher 120 communicates with processors 110a, 110b and 110c via respective busses of bus type B. In this multi-processor environment, processors 110a & 110b are assumed to communicate using busses of bus type A, and thus, bus bridges 140a & 140b are employed to convert requests between bus type A and bus type B, both of which are assumed to comprise coherent busses. Thus, processor 110a and processor 110b communicate with transaction dispatcher 120 via their respective bus bridges 140a, 140b. By way of example, bridges 140a, 140b are assumed to maintain coherency via snooping. One example of computer system 100, wherein cache coherency is maintained via snooping, is a PowerPC 750 System offered by International Business Machines Corporation of Armonk, N.Y.

Those skilled in the art will note that the bus interface disclosed herein can be employed to convert requests between any two types of busses. In one aspect, the present invention solves the problem of maintaining request ordering in a computer system 100 wherein bus bridges are employed to translate requests from one type of processor bus (bus type A) to another type of processor bus (bus type B).

Figure 2:
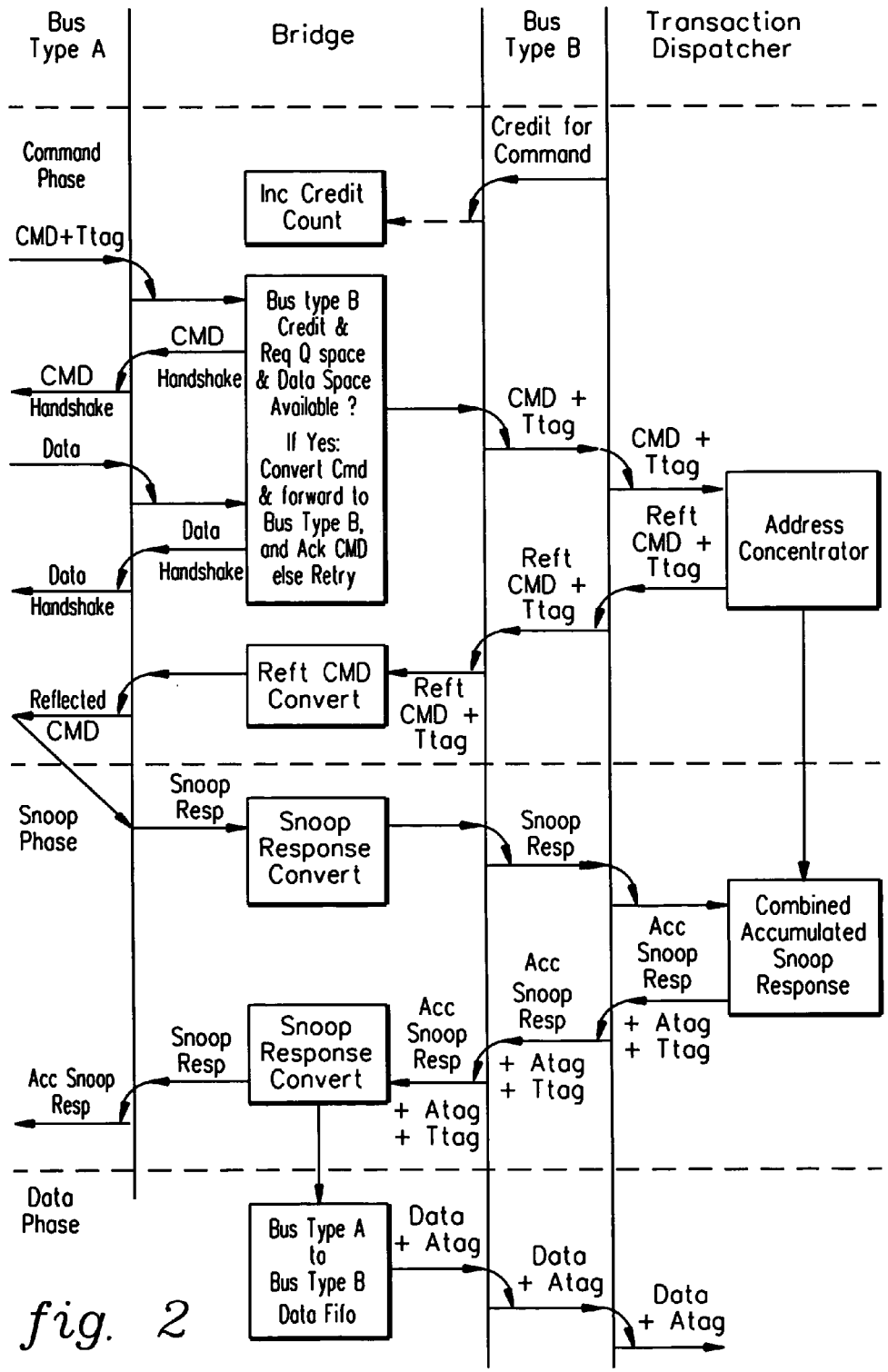
FIG. 2 depicts one example of a write command request translation between bus type A and bus type B employing a coherent bus bridge, in accordance with an aspect of the present invention.
Figure 3:
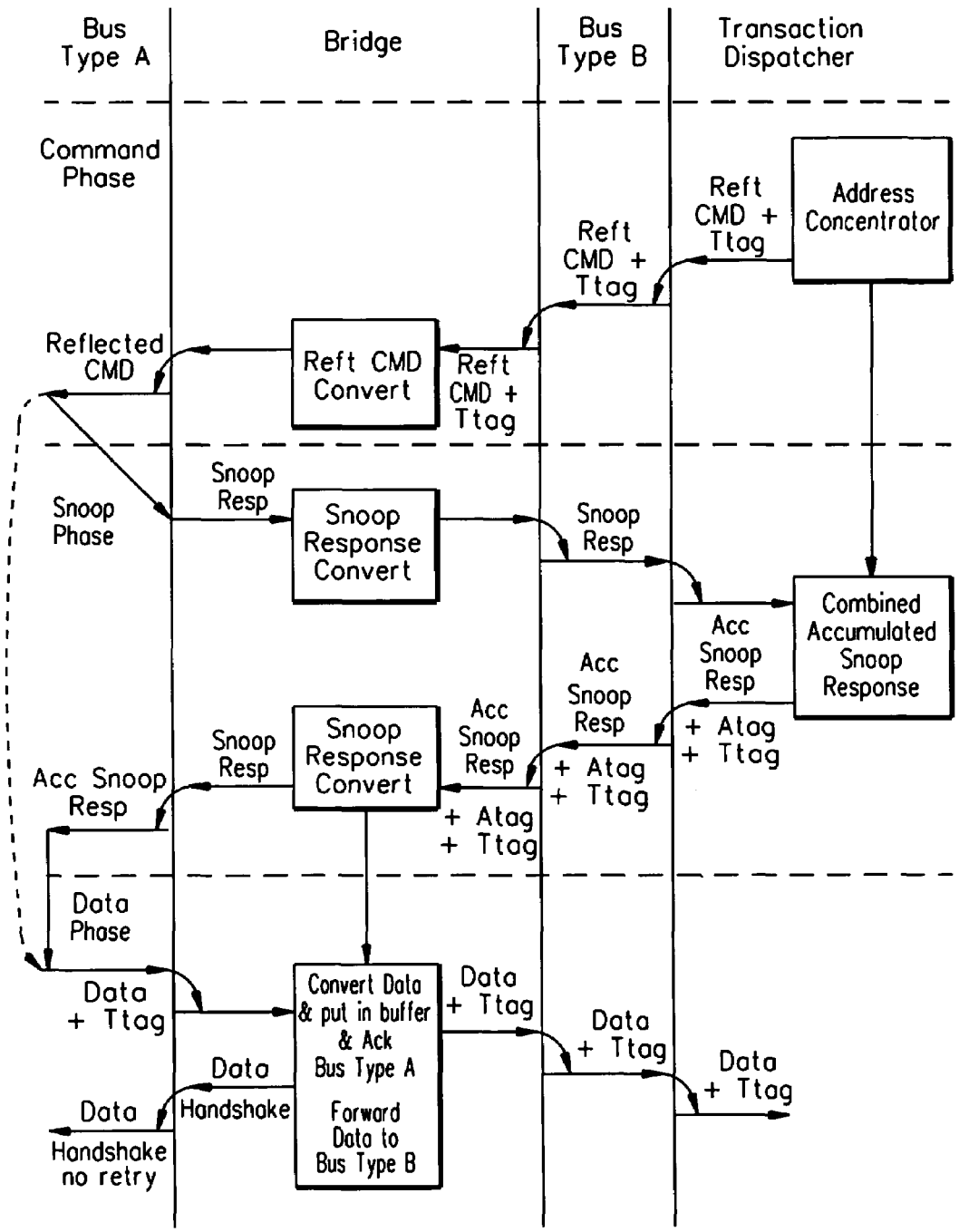
FIG. 3 depicts an example of a read command request translation with modified intervention between bus type A and bus type B employing a coherent bus bridge, in accordance with an aspect of the present invention.

FIG. 2 depicts one conventional example of a write command transaction translation between bus type A and bus type B, while FIG. 3 depicts a conventional example of a read command transaction translation with modified intervention between bus type A and bus type B. Generally stated, after a transaction is initiated by a master, it is sent to a transaction dispatcher where it is reflected back to all processor memory outlets (i.e., caches) in the system that require coherency. This reflected transaction is sent across the processor busses and is sent during the command or reflected transaction phase of the transaction protocol. Thereafter, during a snoop phase, each master and memory element responds with a snoop response as to the ownership (i.e., state) of the address locations being requested in the transaction. An accumulated snoop response is then sent out from the transaction dispatcher to all masters. Finally, the data phase of the protocol completes the transfer of data transaction.

As noted, FIG. 2 is an example of a write transaction protocol. In this transaction, the initiator is assumed to comprise a processor coupled to bus type A. The bus bridge receives and stores credits for processing commands, and at some point in time receives a write command (CMD) and transaction tag (Ttag) from bus type A. This transaction tag is a field of the transaction which identifies the logical device which originated the command, as well as an identifier which is unique with respect to all other outstanding transactions. Assuming that data space is available, the bus bridge captures the write command and converts the command for transfer out on bus type B to an address concentrator within the transaction dispatcher. The address concentrator reflects the write command back across bus type B to the bus bridge, and this reflected command (Reft. CMD) is converted by the bus bridge for return to the processor across bus type A. At the same time, data is received from the processor across bus type A and stored in an available write data buffer (see FIG. 4). Receipt of the data is confirmed via a data handshake protocol between the bus bridge and the processor across bus type A. Upon completion of the data handshake and receipt of the reflected command, the command phase is completed.

In response to the reflected command, the processor sends a snoop response (Snoop Resp.) across bus type A which is received at the bus bridge and converted for transmission across bus type B to the transaction dispatcher. The transaction dispatcher includes logic which combines the snoop response into an accumulated snoop response signal (Acc. Snoop Resp.) for transfer back, along with the transaction tag (Ttag) and an acknowledge tag (Atag). This acknowledge tag identifies the destination logical device for data packets associated with commands such as write commands. Since the data packet for a write command is separate from the command in the Bus B domain, the Atag allows the data packet to be routed through a fabric to the destination device. The bridge received the Atag from the accumulated snoop response and adds it to the data packet. The accumulated snoop response is returned to the bus bridge across bus type B and is converted for transmission across bus type A to the processor. Upon receipt of the accumulated snoop response, order must be maintained in the bus bridge for the still incomplete write command transaction. This is conventionally accomplished employing one or more FIFO buffers. The problem with using standard FIFOs is that write and intervention data packets received from the processor must be re-ordered according to the order dictated by the reception of the snoop responses. This is conventionally accomplished using a FIFO to store buffer identifiers according to received snoop order. In accordance with the present invention, a more efficient counter scheme is presented.

Upon receipt of the accumulated snoop response, the associated data held in the write buffer is signaled by the flow control sub-unit of the bus bridge to be unloaded out onto bus type B during the data phase. Again, in one aspect, the present invention (embodiments of which are presented in FIGS. 4–7) is an enhanced technique for maintaining order of data access to bus type B responsive to receipt of the accumulated snoop response.

FIG. 3 depicts a conventional example of a read command with modified intervention translation protocol as seen by a bus bridge. This transaction is initiated from another master device (e.g., coupled to the system bus in FIG. 1) and is reflected through the transaction dispatcher via the address concentrator across bus type B to the bus bridge (referenced herein as the reflected command (Reft. CMD) plus transaction tag (Ttag)). The bus bridge converts this read with modified intervention command, and then forwards the converted command to the respective processor via bus type A. Responsive to receipt of the command, a snoop phase is entered wherein the processor issues a snoop response (Snoop Resp.) from the reflected command. The snoop response is converted from bus type A to bus type B by the bridge and sent out across bus type B to the transaction dispatcher. The transaction dispatcher then generates an accumulated snoop response (Acc. Snoop Resp.) and puts this accumulated snoop response on bus type B with an accumulated snoop response tag (Atag) and a transaction tag (Ttag). The bus bridge converts this accumulated snoop response and sends it to the processor via bus type A. The snoop conversion happens in a similar manner as commands that were initiated by the processor. The processor has the data being requested in the read intervention transaction, and therefore, the processor forwards this data (Data) and transaction tag (Ttag) to the bus bridge during the data phase. The bus bridge must accept this data from the processor. The bridge puts the data into the bridge command and data conversion unit's intervention data buffers. The intervention buffers also convert the transaction tag, and data size before forwarding the read data to the transaction dispatcher via bus type B.

FIGS. 4–7 depict one embodiment of a coherent bus bridge implementing request ordering in accordance with an aspect of the present invention.

Figure 4:
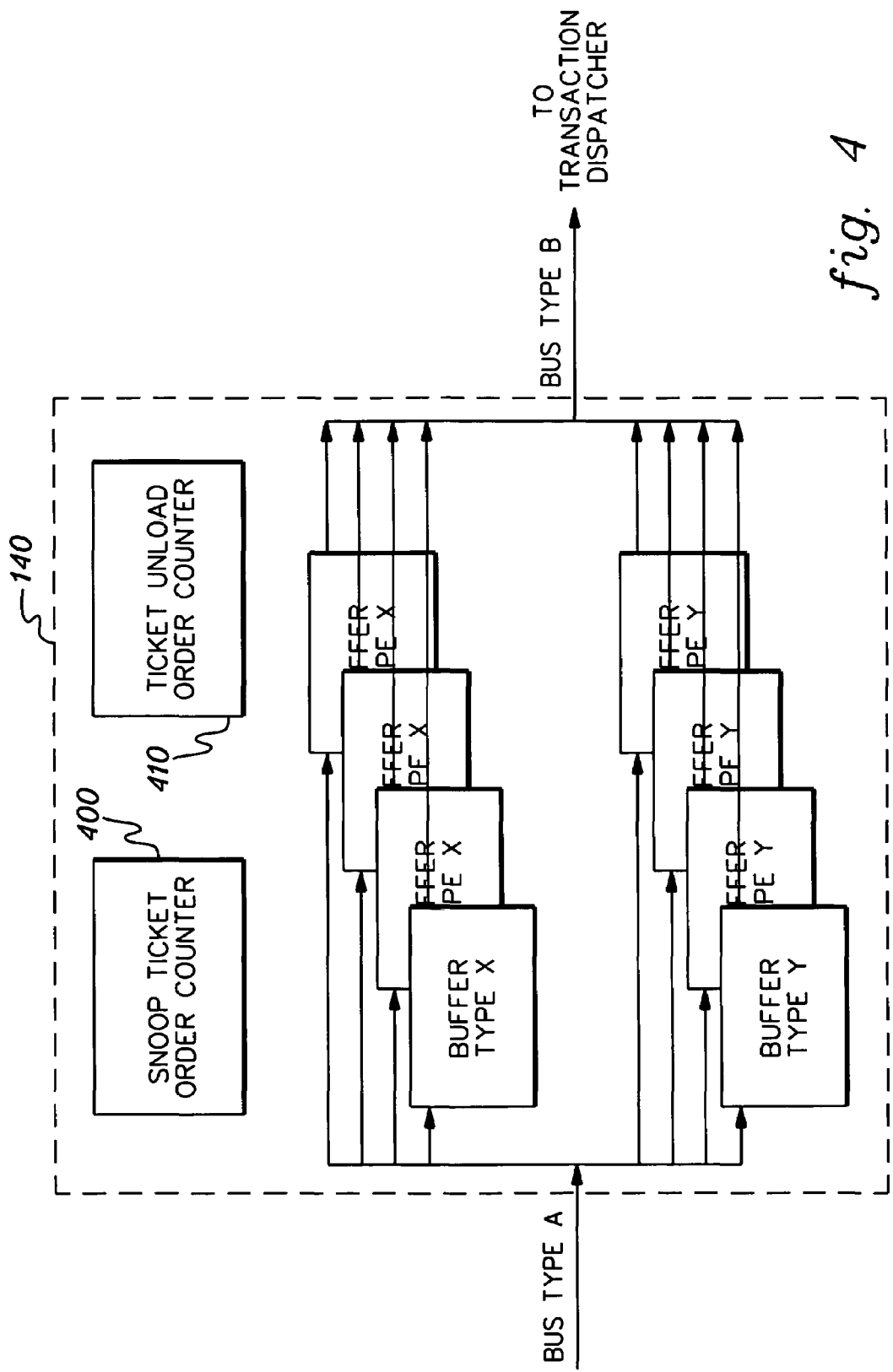
FIG. 4 is a partial block diagram depiction of one embodiment of a bus bridge conversion mechanism for translating a request between bus type A and bus type B, in accordance with an aspect of the present invention.

Beginning with FIG. 4, one embodiment is shown of certain components of a bus bridge conversion mechanism 140 in accordance with an aspect of the present invention. In one implementation, data signals may move from left to right, for example, from a processor coupled to bus type A to the bus bridge and out to bus type B for transmission to the transaction dispatcher, while control signals move from the transaction dispatcher back across bus type B to the bus bridge for conversion and output across bus type A to one or more processors. In the example shown, two different types of buffers, i.e., buffer type X and buffer type Y are depicted. Each type of buffer handles a different type of transaction. For example, buffers of buffer type X might handle a write transaction, while buffers of buffer type Y could handle a read intervention transaction. Both types of buffers are internal buffers that capture data from the processor forwarded across bus type A and initiate transfer of the data on bus type B. Again, one problem addressed by the present invention is to maintain the snoop response order of transactions in the system through the final data phase of the transactions. In accordance with the present invention, the ordering approach presented advantageously gives the buffers a reserved time slot on bus type B allowing the buffers to unload their data as fast as bus type B accepts data.

In accordance with an aspect of the present invention, two counters are added to the bus bridge. The first counter is referred to herein as a snoop ticket order counter 400, and the second counter is referred to as a ticket unload order counter 410. Both counters are coupled to the different internal buffers of the bus interface, and control when a particular buffer can proceed to an unload data state for unloading data onto bus type B (as discussed further below with reference to the state diagram examples of FIGS. 6 & 7). The use of these two counters allows an efficient way to enforce ordering of requests. Although various types of counters could be employed to implement the snoop ticket order counter and the ticket unload order counter, both are assumed to count in a same order and contain more values than the number of outstanding transactions, and both are assumed to increment with each dispensed value.

In one embodiment, a ticket value is captured from the snoop ticket order counter 400 during the global snoop phase of a transaction, and this ticket value is then used to maintain an order of the transaction (i.e., relative to other transactions) for data unloading purposes. After receiving a ticket value, the bus interface, and in particular, the respective internal buffer, can perform other work on the transaction (e.g., many of the required functions necessary to prepare data for sending) while the transaction waits for access to bus type B. By receiving a ticket value from snoop ticket order counter 400 at the time of receiving the accumulated snoop response, the buffers within the bus bridge will unload their data in the same order as their respective accumulated snoop responses are received. When a buffer is finished preparing the data, then the buffer waits for the ticket unload order counter 410 to reach the same ticket value as the buffer originally captured, at which point the buffer can send the data out on bus type B.

Figure 5:
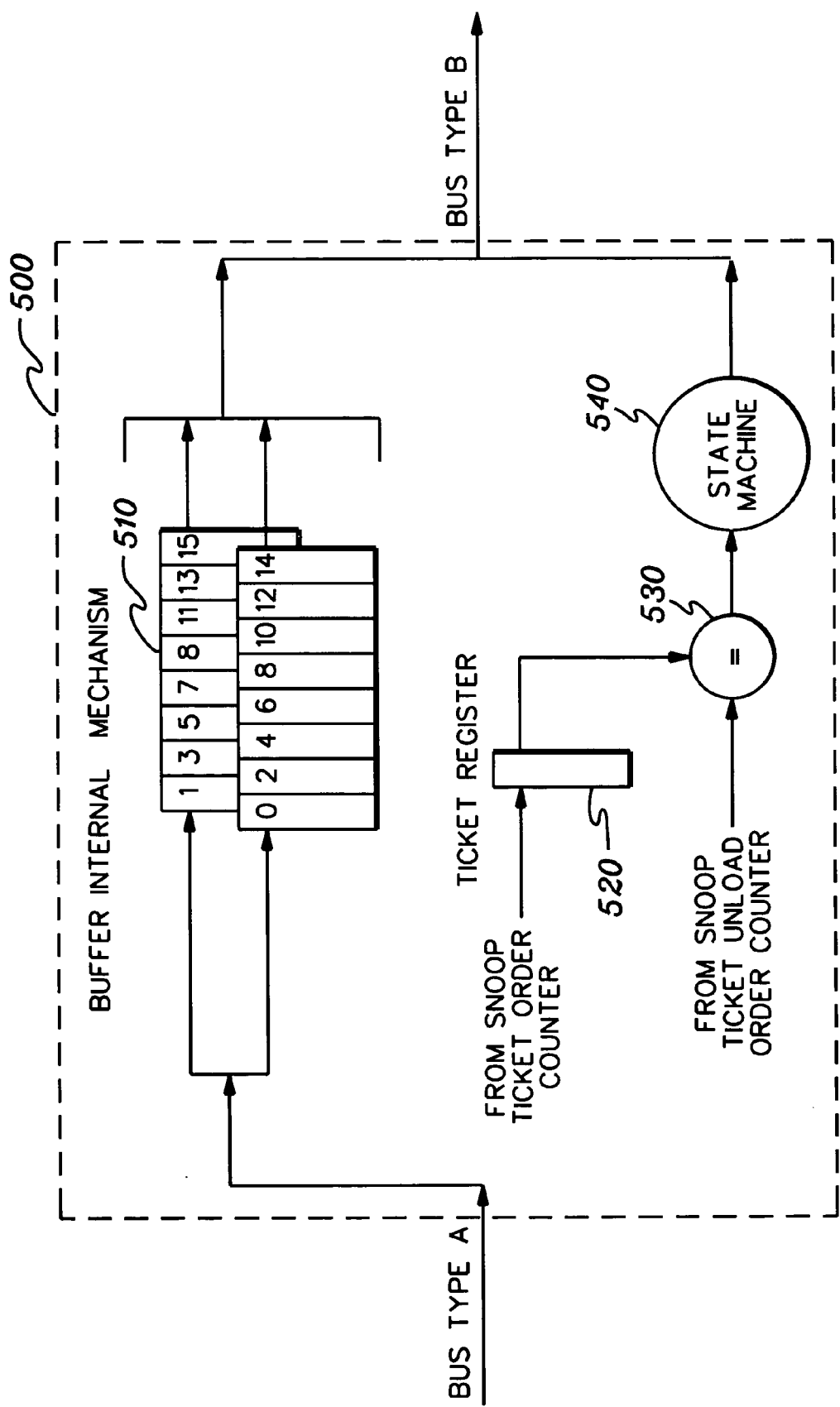
FIG. 5 is a block diagram representation of one embodiment of an internal buffer mechanism for the bus bridge conversion mechanism of FIG. 4, in accordance with an aspect of the present invention.

FIG. 5 depicts one embodiment of a buffer internal mechanism 500, in accordance with an aspect of the present invention. Mechanism 500 is a partial depiction of certain buffer components common to the various buffer-types within the bus bridge. In this buffer embodiment, the mechanism includes sixteen registers 510, which together make up one buffer. Buffer internal mechanism 500 further includes a ticket register 520 which holds the ticket value captured from the snoop ticket order counter 400 of FIG. 4 for a particular request. Each buffer receives a current call value of the ticket unload order counter 410 and compares, via comparison logic 530, the current call value of that counter with the ticket value held in ticket register 520. Once the ticket value equals the current call value of the ticket unload order counter, then the buffer state machine 540 proceeds to an unload buffer data state. Embodiments of a state machine for a read intervention data buffer and a state machine for a write data buffer are depicted in FIGS. 6 & 7, respectively.

Figure 6:
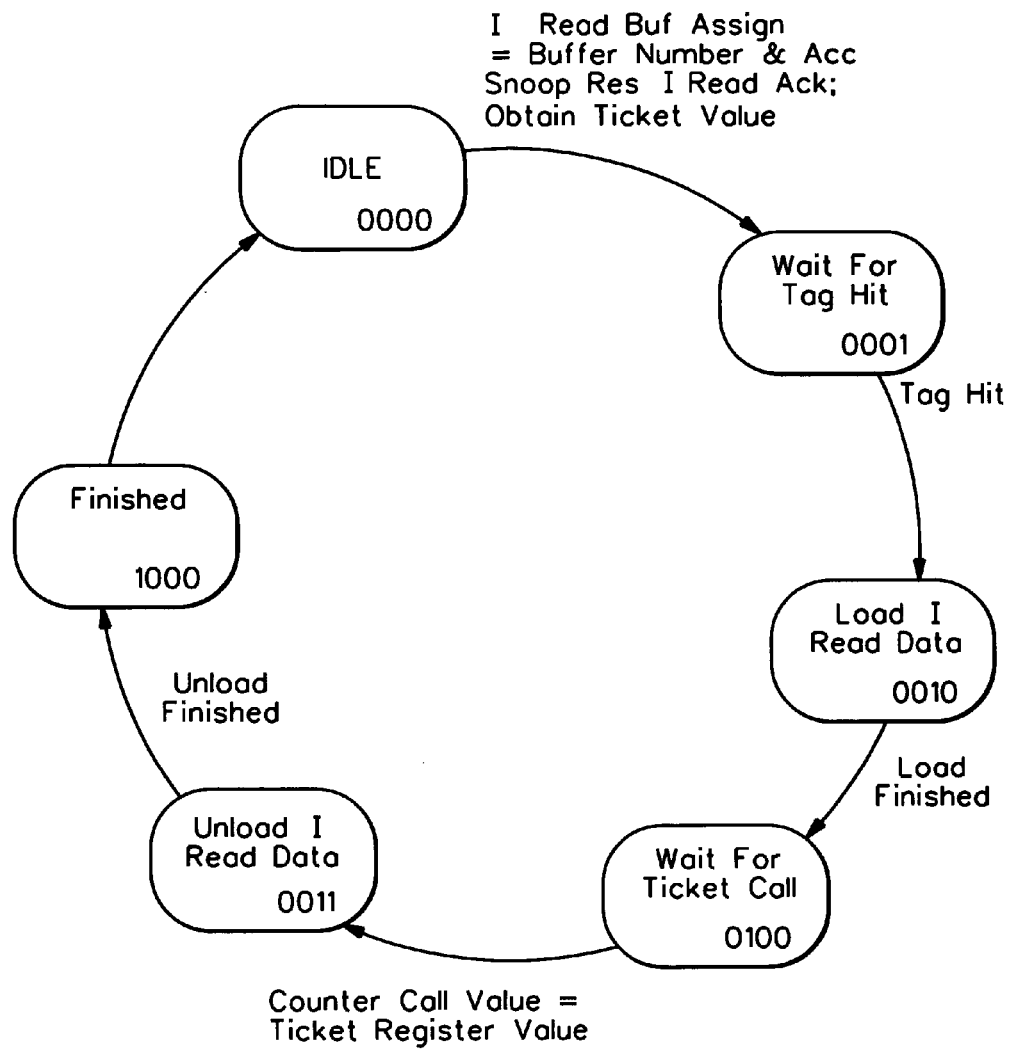
FIG. 6 depicts one embodiment of a read intervention data buffer state machine, in accordance with an aspect of the present invention.

As shown in FIG. 6, a read intervention data buffer transitions from an idle state (0000) upon receiving an accumulated snoop response from a transaction dispatcher. With this transition, the state machine captures a ticket value from the snoop ticket order counter and waits for a tag hit indicative of the processor being ready to send the data to the buffer (0001). Once received, the data is loaded in a next state (0010), after which the buffer waits for the ticket unload order counter call value to equal the ticket value captured into the associated ticket register from the snoop ticket order counter (0100). Once the comparator determines that the ticket call value equals the captured ticket value, then the state machine transitions to the unload read intervention data state (0011), where the buffer proceeds to unload the data onto bus type B for forwarding to the transaction dispatcher. After confirming a finished state (1000), the state machine returns to the idle state (0000).

Figure 7:
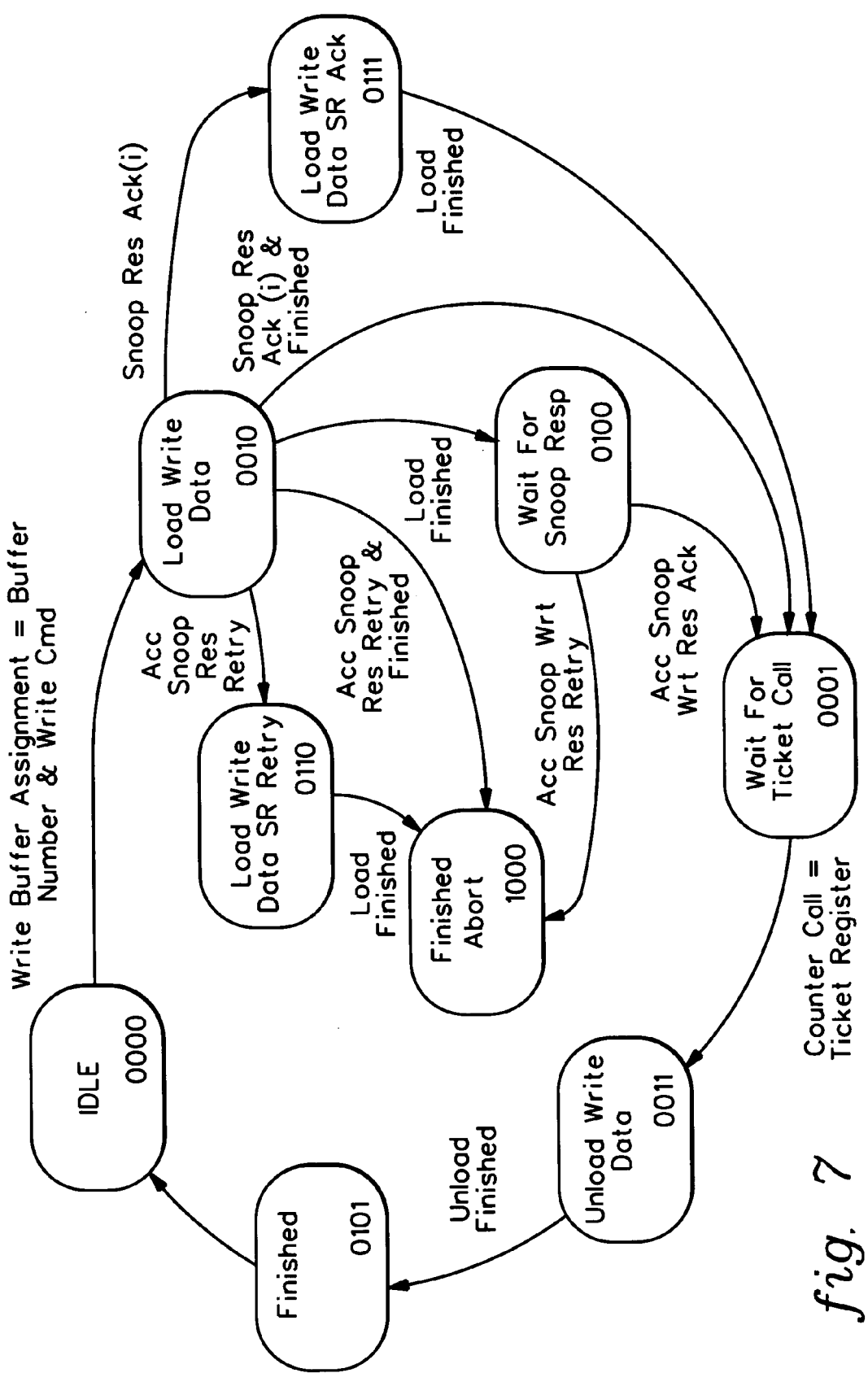
FIG. 7 depicts one embodiment of a write data buffer state machine, in accordance with an aspect of the present invention.

FIG. 7 depicts one embodiment of a write data buffer state machine wherein the buffer transitions from an idle state (0000) to a load write data state (0010) upon receipt of a buffer assignment. If a snoop response acknowledgement is received, then the buffer transitions to a load write data state (0111) until the data load is finished, before transitioning to a wait for ticket call state (0001). If the load write data completes at the time that the snoop response acknowledgment is received, then the state machine transitions directly from state (0010) to the wait for ticket call state (0001). If the write data load finishes before a snoop response acknowledgement is received, then the state machine enters a wait for snoop response acknowledgement state (0100). Upon receipt of the snoop response acknowledgment, the buffer captures a ticket value into the buffer's associated ticket register from the snoop ticket order counter and then enters state (0001). If the snoop response acknowledgement is not received, but rather an accumulated snoop response retry is received, then, depending upon the load write data state, the state machine transitions eventually (e.g., directly, or indirectly via states (0110) or (0100)) to an abort transaction state (1000).

From the wait for ticket call state (0001), the state machine transitions to an unload write data state (0011) upon the ticket unload order counter value equaling the ticket value captured from the snoop ticket order counter. Upon finishing the unloaded data (0101), the buffer transitions back to the idle state (0000).

To summarize, those skilled in the art will note that provided herein are a method and system implementable at a bus interface for maintaining ordering of requests (e.g., transactions) at the buffers of the interface. In one aspect, a method is presented wherein upon receipt of a request for access to a resource, a first counter is employed to assign a value to the request. This requested access to the resource is then granted when a second counter reaches a value equal to the value assigned by the first counter to the request. While waiting for the second counter to reach the value assigned by the first counter, the bus interface, e.g., the buffer state machine, can perform work on the request. For example, the buffer may continue to load the data into the registers comprising the buffer and ready the data for forwarding out onto a requested bus. In one implementation, the bus interface is a bus bridge which includes multiple buffers, each buffer having a respective ticket register and state machine for the buffer. The bus bridge further includes a ticket dispenser counter and a ticket call counter, both of which are coupled to the buffers of the bridge. The ticket dispenser counter dispenses a ticket value to a request received at the bus bridge from a first bus for access to a second bus. This ticket value is held in the respective ticket register of the buffer. The ticket call counter provides ticket call values to the buffers, with each buffer comparing the current ticket call value with the captured ticket value in its associated register. When the two are equal, the requested access to the second bus is granted and the buffer enters an unload data state.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising:
   receiving at a bus interface a request for access to a resource;
   employing a first counter to assign a value to the request;
   buffering the request for access to the resource at the bus interface while waiting for the granting of the request; and
   granting the requested access to the resource when a second counter reaches a value equal to the value assigned by the first counter to the request, wherein the bus interface can take action regarding the request while the request waits for access to the resource.

2. The method of claim 1, wherein the bus interface includes multiple types of buffers, and the method further comprises buffering the request in one type of buffer of the multiple types of buffers based on a request type of the request.

3. The method of claim 2, wherein the request type comprises one of a write transaction and a read transaction.

4. The method of claim 1, wherein buffering the request comprises buffering the request in one buffer of a plurality of buffers of the bus interface, and wherein each buffer of the plurality of buffers includes an associated request state machine, and wherein the associated request state machine of the one buffer takes action regarding the request while the request waits for access to the resource.

5. The method of claim 1, further comprising maintaining request coherency at the bus interface employing snooping, and wherein the first counter assigns the value to the request during a snoop phase of the request.

6. The method of claim 5, further comprising repeating the method for a plurality of requests, and wherein the values assigned to the plurality of requests by the first counter maintain a snoop response ordering of the plurality of requests for access to the resource, while the bus interface takes action regarding at least one request of the plurality of requests.

7. The method of claim 6, wherein the bus interface comprises a bus bridge coupled between a first bus and a second bus, the first bus and the second bus comprising different bus types.

8. The method of claim 1, wherein the first counter and the second counter have offset values, and count in the same order.

9. A system comprising:
   means for receiving at a bus interface a request for access to a resource, the bus interface including multiple types of buffers;
   means for employing a first counter to assign a value to the request;
   means for buffering the request in one type of buffer of the multiple types of buffers based on a request type of the request; and
   means for granting the requested access to the resource when a second counter reaches a value equal to the value assigned by the first counter to the request, wherein the bus interface can take action regarding the request while the request waits for access to the resource.

10. The system of claim 9, wherein the request type comprises one of a write transaction and a read transaction.

11. The system of claim 9, wherein each buffer of the multiple types of buffers includes an associated request state machine, and wherein the associated request state machine of the one type of buffer buffering the request takes action regarding the request while the request waits for access to the resource.

12. The system of claim 9, further comprising means for maintaining request coherency at the bus interface employing snooping, and wherein the first counter is employed to assign the value to the request during a snoop phase of the request.

13. The system of claim 12, wherein the means for receiving, the means for employing and the means for granting are repeated for a plurality of requests, and wherein the values assigned to the plurality of requests by the first counter maintain a snoop response ordering of the plurality of requests for access to the resource, while the bus interface takes action regarding at least one request of the plurality of requests.

14. The system of claim 13, wherein the bus interface comprises a bus bridge coupled between a first bus and a second bus, the first bus and the second bus comprising different bus types.

15. The system of claim 9, wherein the first counter comprises a ticket dispenser counter for dispensing a ticket value to the request, and the second counter comprises a ticket call counter for providing ticket call values, wherein the request is granted access to the resource when a ticket call value equals the ticket value dispensed to the request by the ticket dispenser counter, wherein the bus interface can takes action regarding the request while the bus interface waits for the ticket call value to equal the dispensed ticket value.

16. A system comprising:
a bus bridge for coupling between a first bus and a second bus, the bus bridge including:
multiple ticket registers;
a ticket dispenser counter for dispensing a ticket value to a request received at the bus bridge from the first bus for access to the second bus, the ticket value being held in one ticket register of the multiple ticket registers; and
a ticket call counter for providing ticket call values, wherein the request is granted access to the second bus when a ticket call value equals the ticket value dispensed to the request by the ticket dispenser counter, and wherein the bus bridge can take action regarding the request while the request waits for access to the second bus.

17. The system of claim 16, further comprising multiple request state machines, each request state machine being associated with a respective ticket register of the multiple ticket registers, and wherein the request state machine associated with the one ticket register holding the ticket value for the request can take action regarding the request while the request waits for access to the second bus.

18. The system of claim 17, further comprising multiple buffers, each buffer comprising a ticket register of the multiple ticket registers and an associated request state machine of the multiple request state machines, and wherein each buffer further comprises a comparator for determining when the ticket call value provided by the ticket call counter equals the ticket value dispensed to the request by the ticket dispenser counter.

19. The system of claim 18, wherein the multiple buffers comprise at least two types of buffers, and wherein the request is buffered in one type of buffer of the at least two types of buffers based on a request type of the request.

20. The system of claim 19, wherein the request type comprises one of a write transaction and a read transaction.

21. The system of claim 16, further comprising a processor coupled to the first bus, and a transaction dispatcher coupled to the second bus, and wherein the request received at the bus bridge is from the processor.

22. The system of claim 16, wherein the first bus and the second bus comprise different bus types.

23. The system of claim 22, wherein the first bus and the second bus comprise at least one of an application programming interface (API) bus and a message passing interface (MPI) bus.

24. The system of claim 16, wherein coherency is maintained within the bus bridge via snooping, and wherein the ticket dispenser counter dispenses the ticket value to the request during a snoop phase of the request.

25. The system of claim 24, wherein the ticket dispenser counter dispenses a plurality of ticket values to a plurality of requests received at the bus bridge, and wherein the ticket values assigned to the plurality of requests by the ticket dispenser counter maintain a snoop response ordering of the plurality of requests for access to the second bus, while the bus interface takes action regarding at least one request of the plurality of requests.

* * * * *